(12) United States Patent
Saruwatari et al.

(10) Patent No.: US 7,443,606 B2
(45) Date of Patent: Oct. 28, 2008

(54) ZOOM LENS SYSTEM AND IMAGE PICKUP APPARATUS HAVING THE SAME

(75) Inventors: Hiroshi Saruwatari, Utsunomiya (JP); Hiroyuki Hamano, Koga (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 11/539,652

(22) Filed: Oct. 9, 2006

(65) Prior Publication Data

US 2007/0091460 A1    Apr. 26, 2007

(30) Foreign Application Priority Data

Oct. 15, 2005    (JP) .............................. 2005-301083

(51) Int. Cl.
*G02B 15/14* (2006.01)
(52) U.S. Cl. ..................................... 359/687
(58) Field of Classification Search ................ 359/687
See application file for complete search history.

(56) References Cited

U.S. PATENT DOCUMENTS

| | | |
|---|---|---|
| 5,963,378 A | 10/1999 | Tochigi et al. |
| 6,016,228 A | 1/2000 | Uzawa |
| 6,166,864 A | 12/2000 | Horiuchi |
| 6,456,441 B2 | 9/2002 | Hoshi |
| 6,853,496 B2 | 2/2005 | Eguchi |
| 6,975,461 B2 | 12/2005 | Eguchi |
| 2005/0134971 A1* | 6/2005 | Yamashita .................. 359/687 |

FOREIGN PATENT DOCUMENTS

| | | |
|---|---|---|
| JP | 07-128619 A | 5/1995 |
| JP | 07-270684 A | 10/1995 |
| JP | 10-062687 A | 3/1998 |
| JP | 2001-194586 A | 7/2001 |
| JP | 2003-315676 A | 11/2003 |
| JP | 2004-094233 A | 3/2004 |
| WO | 11-305124 A | 11/1999 |

* cited by examiner

*Primary Examiner*—William C Choi
(74) *Attorney, Agent, or Firm*—Canon U.S.A., Inc., IP Division

(57) ABSTRACT

At least one exemplary embodiment is directed to a zoom lens system, which includes, in order from an object side to an image side, a first lens unit of positive optical power, a second lens unit of negative optical power, a third lens unit of positive optical power, and a fourth lens unit of positive optical power. During zooming, each of the lens units moves.

16 Claims, 9 Drawing Sheets

ZOOM LENS SYSTEM AND IMAGE PICKUP APPARATUS HAVING THE SAME

BACKGROUND OF THE INVENTION

1. Field of the Invention

The present invention relates to a zoom lens system and, more particularly though not exclusively, to an image pickup apparatus having the zoom lens system.

2. Description of the Related Art

In recent years, image pickup apparatuses, for example, a video camera, a digital still camera, and a broadcast camera, which use solid-state image sensing devices, and a camera using a silver-halide film have realized high level functions. Also, the image pickup apparatuses entire size has been miniaturized. A zoom lens, which has the features of being compact, short in overall length, and has a high resolution, would be useful as a shooting (photographic) optical system used in an image pickup apparatus.

What is called a rear-focus type zoom lens adapted to perform focusing by moving lens units, which are other than a first lens unit provided at an object side, is known as a zoom lens that has the features mentioned above (see Japanese Patent Application Laid-Open No. 7-270684 (corresponding to U.S. Pat. No. 5,963,378) and Japanese Patent Application Laid-Open No. 11-305124 (corresponding to U.S. Pat. No. 6,166,864)).

Generally, to enhance accommodatability of a camera in a nonused state (or no-image-taking state), it is effective to collapse (retract) each lens unit.

However, a 4-unit zoom lens of the zoom type discussed in Japanese Patent Application Laid-Open Nos. 7-270684 and 11-305124, where a second lens unit from an object side performs most of a function of varying a focal length, is unsuitable for a collapsible (retractable) structure, because image displacement sensitivity versus eccentricity of the first and second lens units is too high.

On the other hand, a 4-unit zoom lenses suitable for a collapsible structure are discussed in Japanese Patent Application Laid-Open No. 10-62687 (corresponding to U.S. Pat. No. 6,016,228), Japanese Patent Application Laid-Open No. 2001-194586 (corresponding to U.S. Pat. No. 6,456,441), Japanese Patent Application Laid-Open No. 2003-315676 (corresponding to U.S. Pat. No. 6,975,461), and Japanese Patent Application Laid-Open No. 2004-94233 (corresponding to U.S. Pat. No. 6,853,496).

Meanwhile, an optical system adapted to correct image shake by displacing a part of lens units is discussed in Japanese Patent Application Laid-Open No. 7-128619.

Generally, to miniaturize a shooting optical system, it is advisable to reduce the number of lenses and to simultaneously increase refractive power of each lens unit of the shooting optical system. However, in the shooting optical system of such a configuration, lens thickness increases. This results in insufficient shortening of a lens system, and makes it difficult to correct various aberrations.

When lens units are accommodated in a camera by being collapsed thereinto while the camera is not used, mechanical and structural errors due to inclination of a lens or a lens unit increase. In a case where the sensitivity versus eccentricity of each lens or lens unit (ratio of an amount of displacement of an image to an amount of eccentricity (or inclination) of each lens or lens unit) is high, degradation of optical performance and image shake during zooming are caused. Therefore, it is useful to reduce the sensitivity versus eccentricity of each lens or lens unit as much as possible in the shooting optical system.

Although the zoom lens discussed in Japanese Patent Application Laid-Open No. 10-62687 is suitable for a collapsible structure, a first lens unit is stationary during zooming. Thus, it is difficult to reduce the overall length of the lens when the focal length of the lens is set at a wide-angle end, and to decrease the diameter of a front lens thereof.

In the zoom lens discussed in Japanese Patent Application Laid-Open No. 2001-194586, an amount of movement of a first lens unit from a wide-angle-end to a telephoto end during zooming is small. Thus, it is difficult to sufficiently reduce the size of an entrance pupil when the focal length of the lens is set at the wide-angle end, and to decrease the diameter of a front lens thereof.

The zoom lens discussed in Japanese Patent Application Laid-Open No. 2003-315676 obtains a zoom ratio of about 5 by appropriately determining a load of varying a focal length, which is imposed onto a third lens unit from an object side. To realize a higher zoom ratio in the zoom lens discussed in Japanese Patent Application Laid-Open No. 2003-315676, thus it can be useful to share the load between the third lens unit and a second lens unit.

The zoom lens discussed in Japanese Patent Application Laid-Open No. 2004-94233 determines a moving path (locus) of a fourth lens, which is caused by zooming, to reduce variation of an entrance pupil and to decrease the diameter of a front lens.

To realize a higher zoom ratio in the zoom lens discussed in Japanese Patent Application Laid-Open No. 2004-94233, the overall length of the lens increases.

SUMMARY OF THE INVENTION

An aspect of at least one exemplary embodiment of the present invention is to solve the problems of the above-described related zoom lenses and to provide a zoom lens system enabled to reduce the overall length of the lens and to show good optical performance over the entire zooming range from a wide-angle end to a telephoto end.

According to an aspect of the present invention, a zoom lens system includes, in order from an object side to an image side, a first lens unit of positive optical power, a second lens unit of negative optical power, a third lens unit of positive optical power, and a fourth lens unit of positive optical power. Zooming can be performed by moving each of the lens units. The first lens unit can move during zooming so that position of the first lens unit, which corresponds to a telephoto end, is closer to the object side than position of the first lens unit, which correspond to a wide-angle end. The third lens unit can move during zooming so that position of the third lens unit, which corresponds to a telephoto end, is closer to the object side than position of the third lens unit, which corresponds to a wide-angle end. A ratio $\beta 2z$ of an imaging magnification of the second lens unit, corresponding to the telephoto end, to an imaging magnification of the second lens unit, corresponding to the wide-angle end, a ratio $\beta 3z$ of an imaging magnification of the third lens unit, corresponding to the telephoto end, to an imaging magnification of the third lens unit, corresponding to the wide-angle end, a focal length f2 of the second lens unit, and a focal length ft of the zoom lens system corresponding to the telephoto end can satisfy the following conditions:

$$0.7 < \beta 2z/\beta 3z < 1.3,$$

and $$-0.3 \leq f2/ft \leq -0.1.$$

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain at least some of the principles of the present invention.

DETAILED DESCRIPTION OF THE EMBODIMENTS

Figure 1:
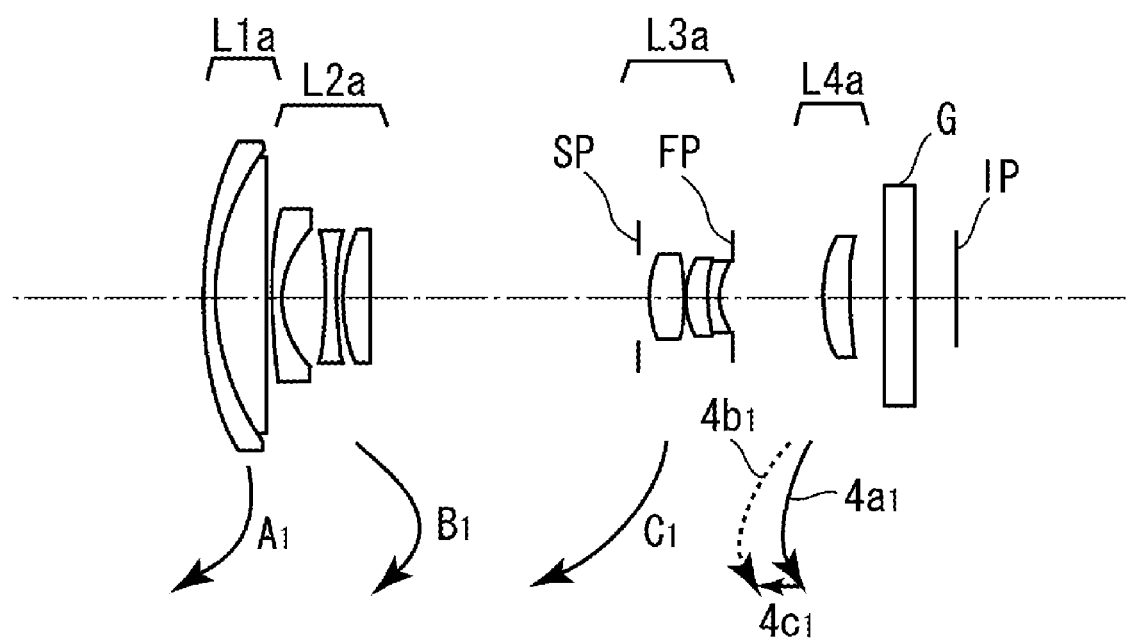
FIG. 1 is a cross-sectional diagram of a zoom lens system according to a first exemplary embodiment of the present invention at a wide-angle end.

Exemplary embodiments of the invention will be described in detail below with reference to the drawings.

Hereinafter, exemplary embodiments of zoom lens systems according to the present invention and an exemplary embodiment of an image pickup apparatus having the zoom lens system according to an exemplary embodiment of the present invention are described below.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Figure 2:
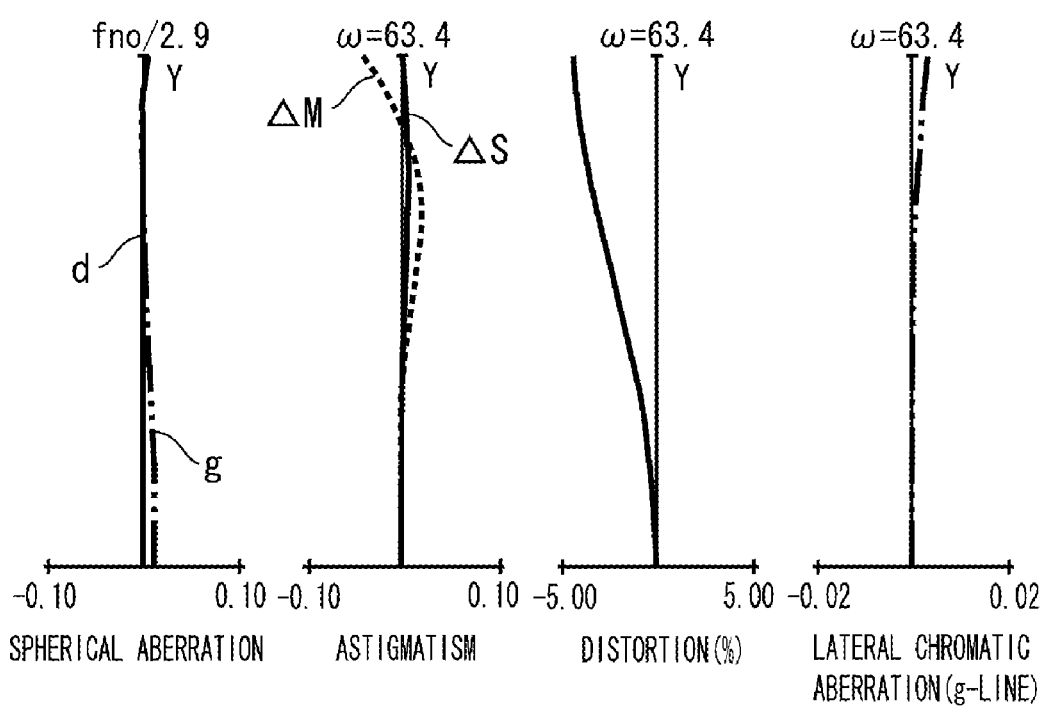
FIG. 2 is an aberration diagram showing aberrations occurring in the zoom lens system according to the first exemplary embodiment of the present invention at the wide-angle end.
Figure 3:
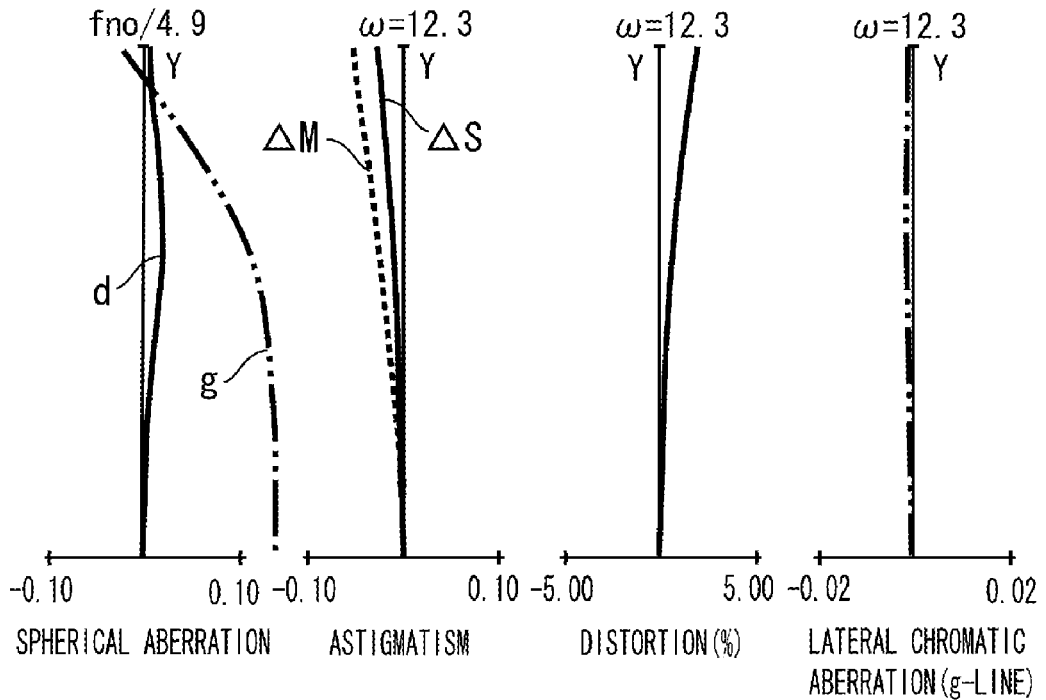
FIG. 3 is an aberration diagram showing aberrations occurring in the zoom lens system according to the first exemplary embodiment of the present invention at a telephoto end.

FIG. 1 is a cross-sectional diagram of a zoom lens system according to a first exemplary embodiment at a wide-angle end (short focal length end) . FIG. 2 is an aberration diagram showing aberrations occurring in the zoom lens system according to the first exemplary embodiment at the wide-angle end. FIG. 3 is an aberration diagram showing aberrations occurring in the zoom lens system according to the first exemplary embodiment at a telephoto end (long focal length end).

Figure 4:
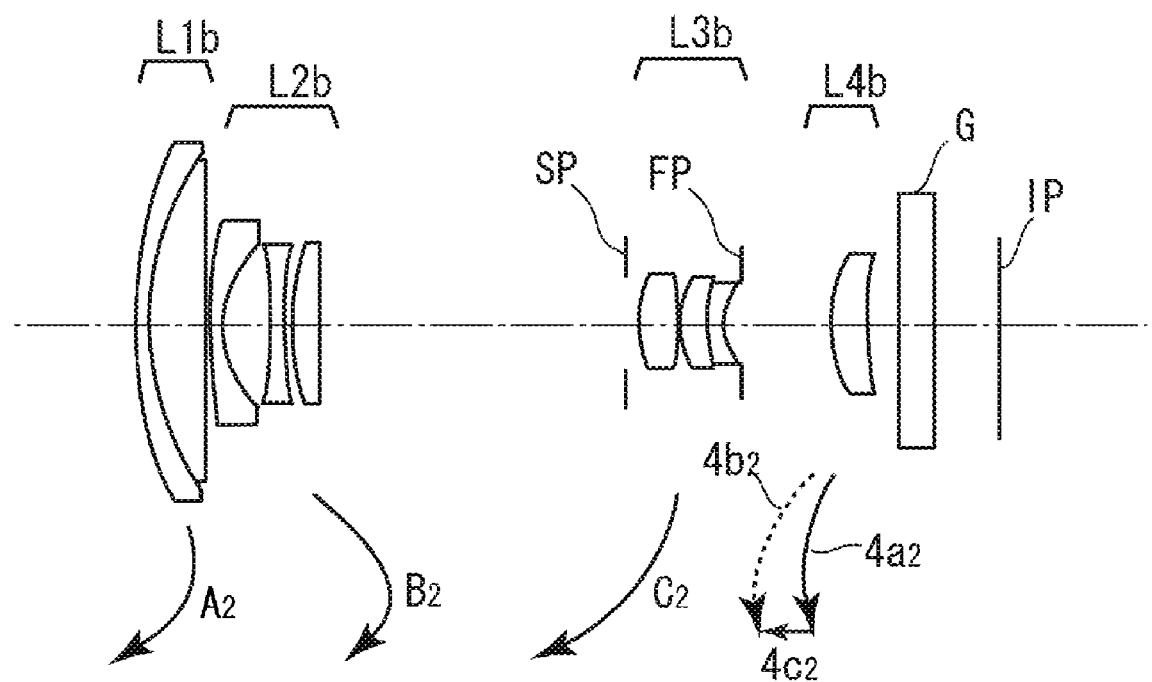
FIG. 4 is a cross-sectional diagram of a zoom lens system according to a second exemplary embodiment of the present invention at a wide-angle end.
Figure 5:
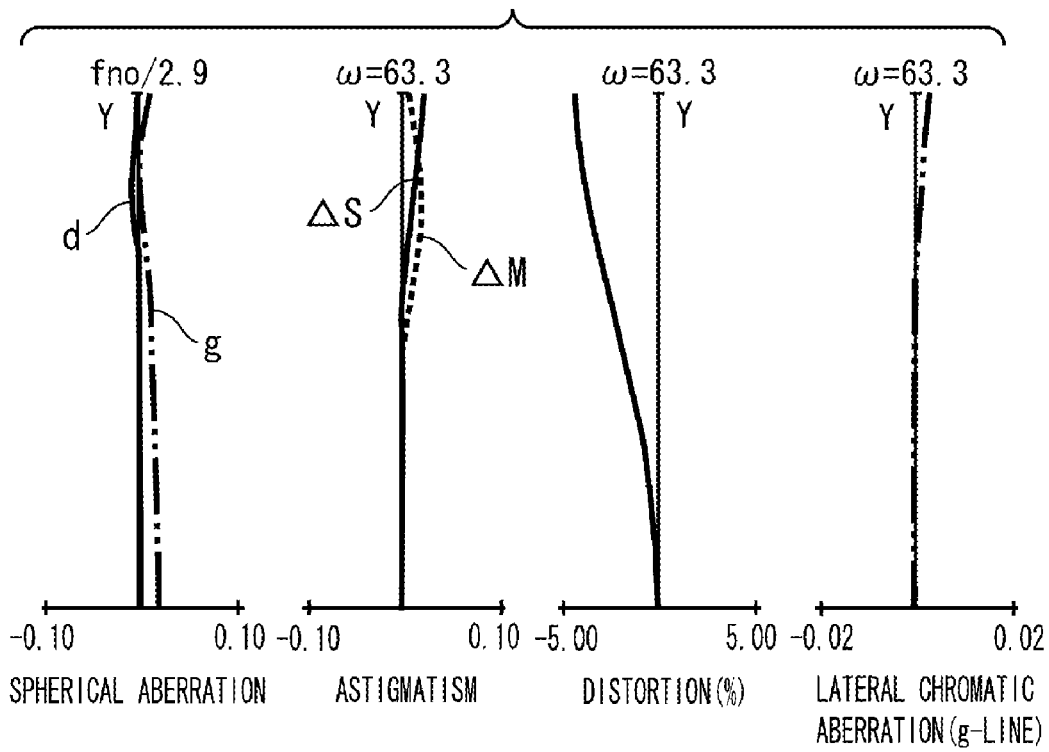
FIG. 5 is an aberration diagram showing aberrations occurring in the zoom lens system according to the second exemplary embodiment of the present invention at the wide-angle end.
Figure 6:
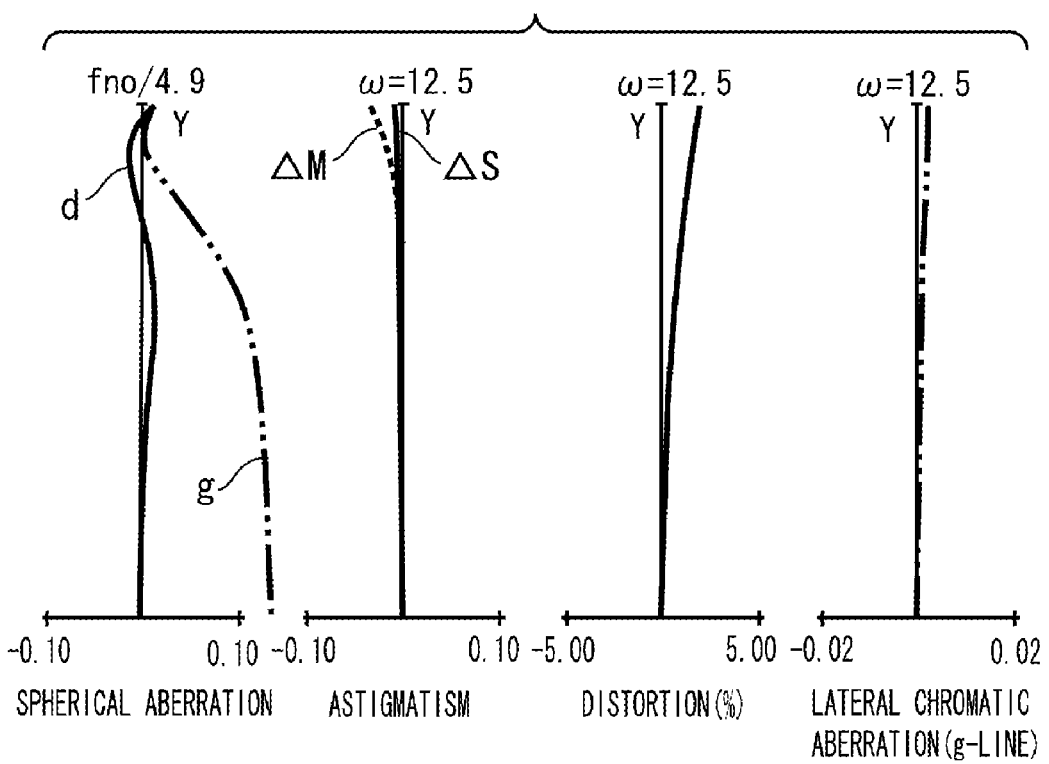
FIG. 6 is an aberration diagram showing aberrations occurring in the zoom lens system according to the second exemplary embodiment of the present invention at a telephoto end.

FIG. 4 is a cross-sectional diagram of a zoom lens system according to a second exemplary embodiment at a wide-angle end. FIG. 5 is an aberration diagram showing aberrations occurring in the zoom lens system according to the second exemplary embodiment at the wide-angle end. FIG. 6 is an aberration diagram showing aberrations occurring in the zoom lens system according to the second exemplary embodiment at a telephoto end.

Figure 7:
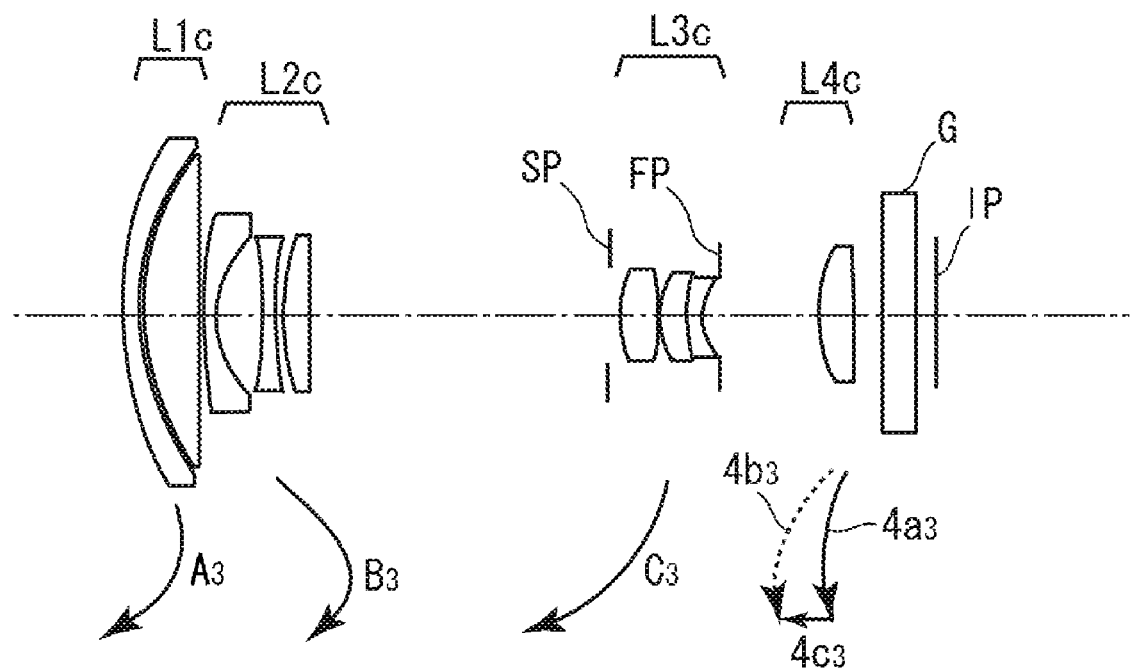
FIG. 7 is a cross-sectional diagram of a zoom lens system according to a third exemplary embodiment of the present invention at a wide-angle end.
Figure 8:
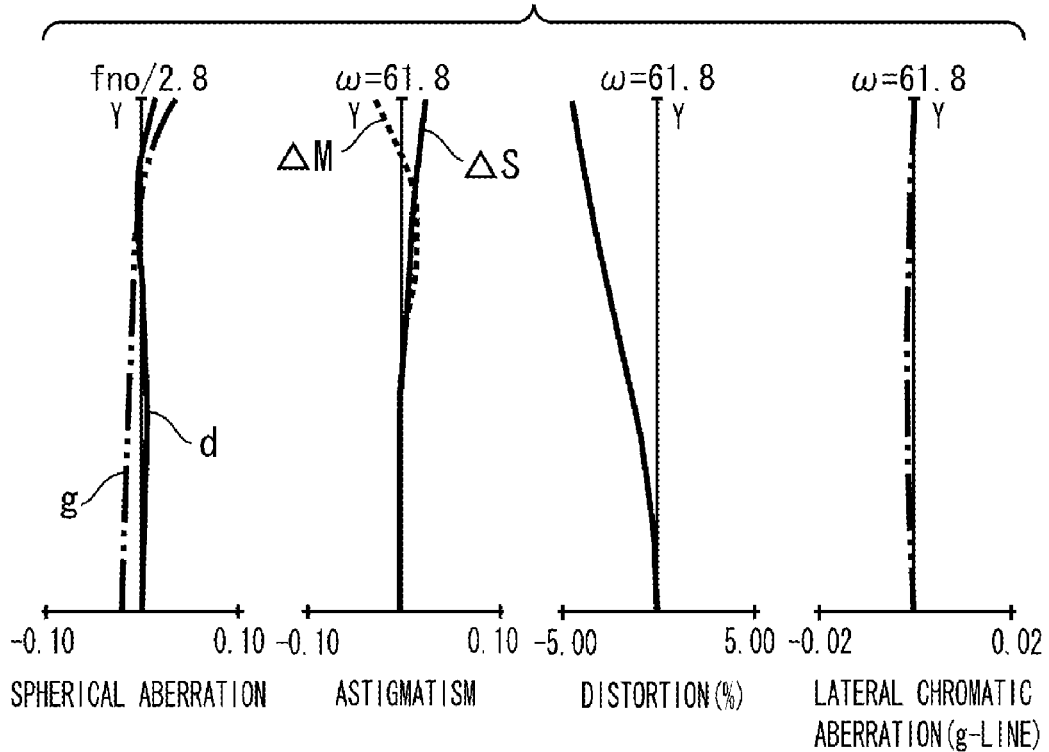
FIG. 8 is an aberration diagram showing aberrations occurring in the zoom lens system according to the third exemplary embodiment of the present invention at the wide-angle end.
Figure 9:
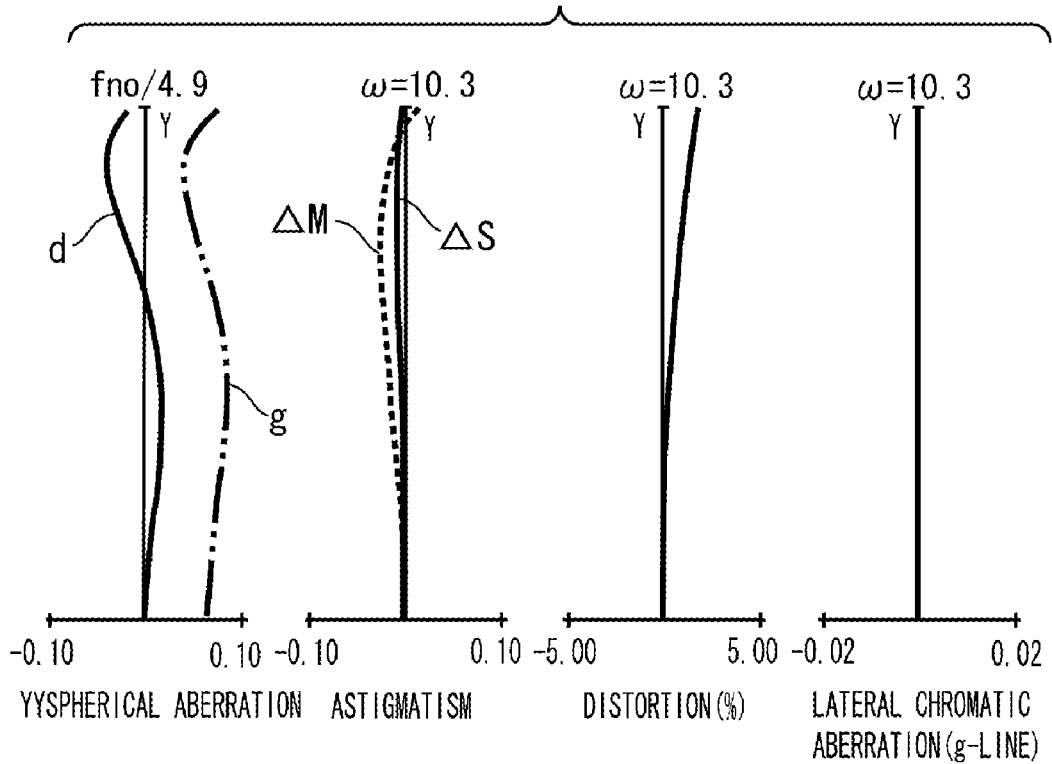
FIG. 9 is an aberration diagram showing aberrations occurring in the zoom lens system according to the third exemplary embodiment of the present invention at a telephoto end.

FIG. 7 is a cross-sectional diagram of a zoom lens system according to a third exemplary embodiment at a wide-angle end. FIG. 8 is an aberration diagram showing aberrations occurring in the zoom lens system according to the third exemplary embodiment at the wide-angle end. FIG. 9 is an aberration diagram showing aberrations occurring in the zoom lens system according to the third exemplary embodiment at a telephoto end.

Figure 10:
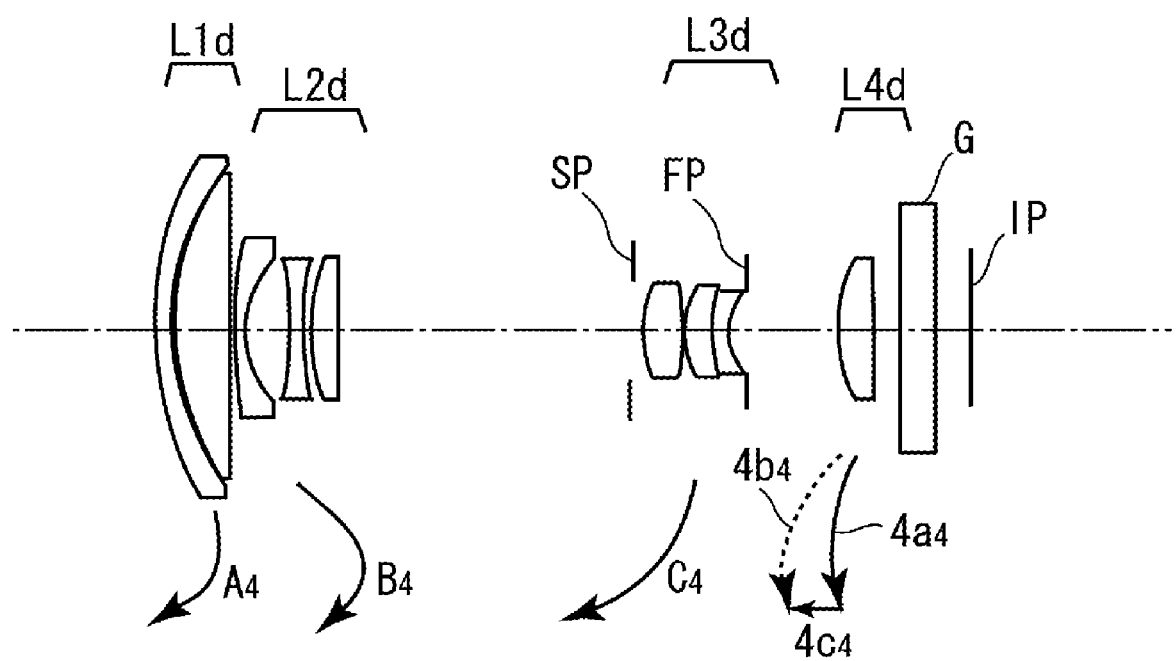
FIG. 10 is a cross-sectional diagram of a zoom lens system according to a fourth exemplary embodiment of the present invention at a wide-angle end.
Figure 11:
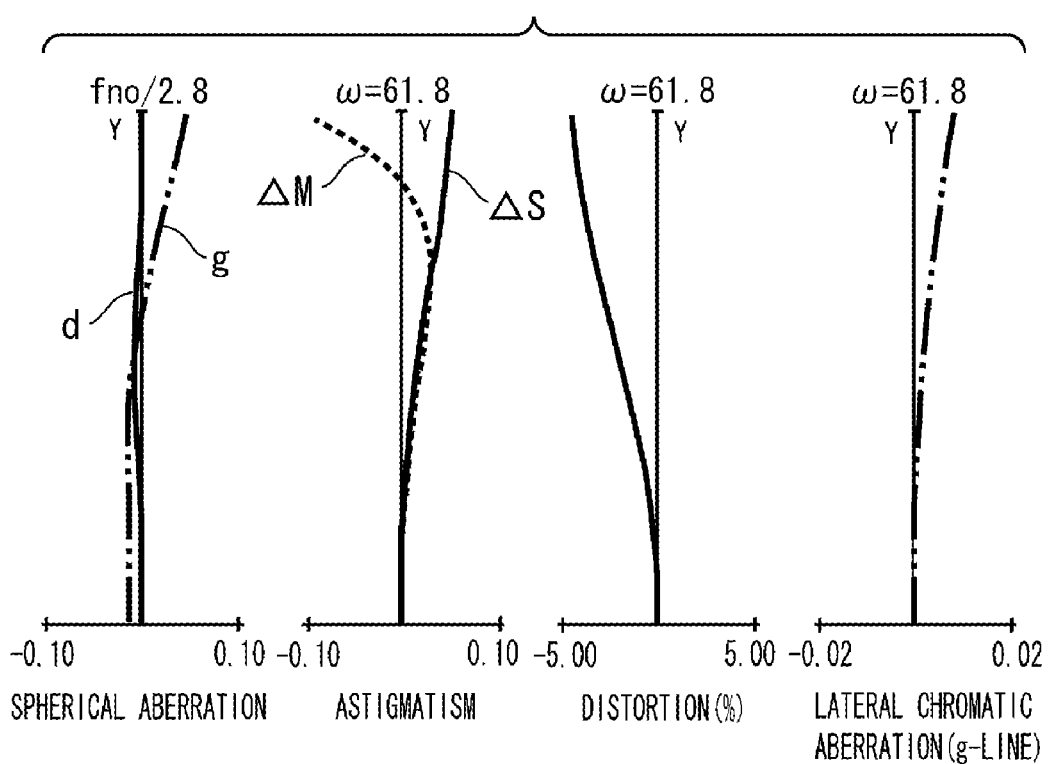
FIG. 11 is an aberration diagram showing aberrations occurring in the zoom lens system according to the fourth exemplary embodiment of the present invention at the wide-angle end.
Figure 12:
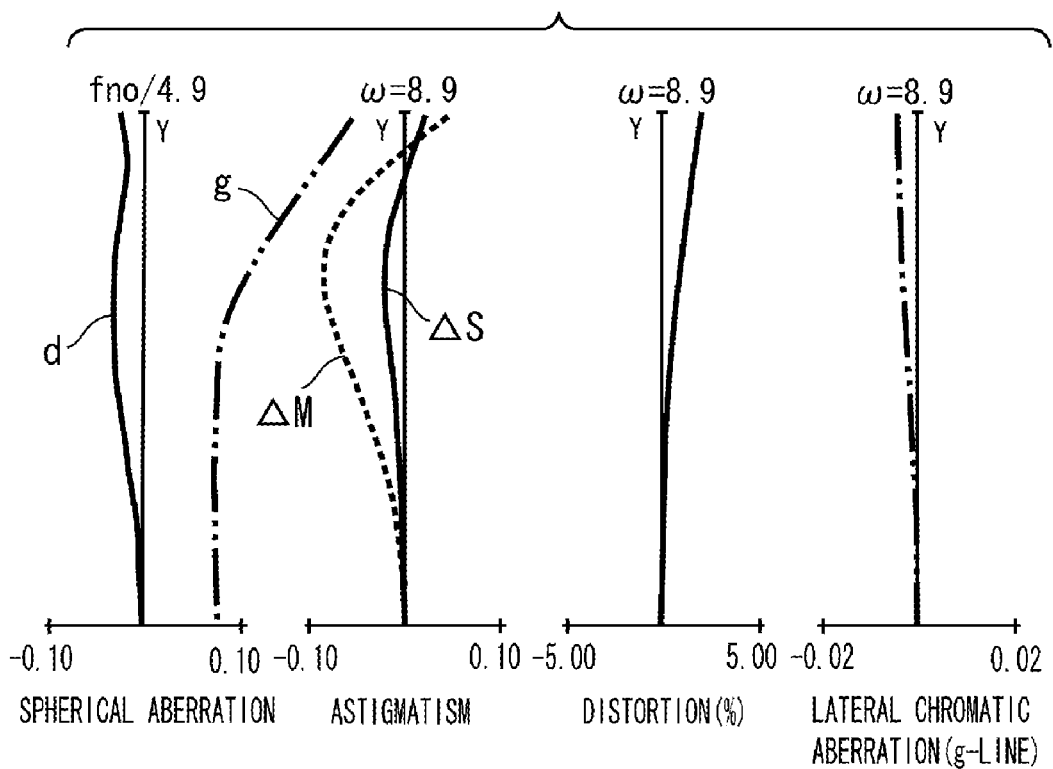
FIG. 12 is an aberration diagram showing aberrations occurring in the zoom lens system according to the fourth exemplary embodiment of the present invention at a telephoto end.

FIG. 10 is a cross-sectional diagram of a zoom lens system according to a fourth exemplary embodiment at a wide-angle end. FIG. 11 is an aberration diagram showing aberrations occurring in the zoom lens system according to the fourth exemplary embodiment at the wide-angle end. FIG. 12 is an aberration diagram showing aberrations occurring in the zoom lens system according to the fourth exemplary embodiment at a telephoto end.

Figure 13:
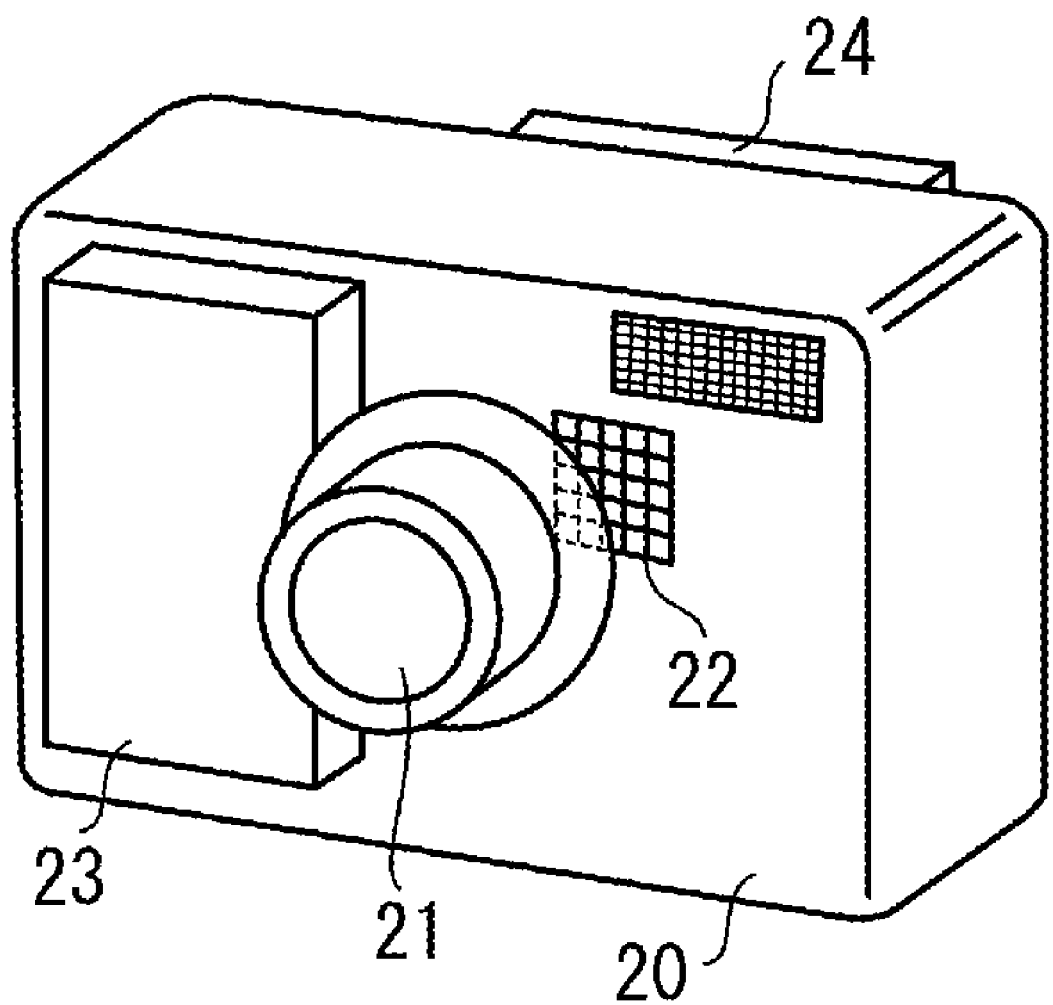
FIG. 13 is a schematic diagram of an image pickup apparatus having a zoom lens system according to an exemplary embodiment of the present invention.

FIG. 13 is a schematic diagram of a camera (image pickup apparatus) having a zoom lens system according to an exemplary embodiment of the present invention.

The zoom lens system of each of the exemplary embodiments is an shooting lens system used in an image pickup apparatus, (e.g., as a video camera, a digital still camera, a silver-halide film camera, and other image pickup apparatus as known by one of ordinary skill in the relevant arts). As viewed in each of the cross-sectional diagrams of the zoom lens system, the left side is an object side (front side), while the right side is an image side (rear side).

As shown in each of the cross-sectional diagrams of the lens system in accordance with various exemplary embodiments, the zoom lens system includes a first lens unit L1$a$-$d$ of positive refractive power (optical power=a reciprocal of a focal length), a second lens unit L2$a$-$d$ of negative refractive power, a third lens unit L3a-d of positive refractive power, and a fourth lens unit L4a-d of positive refractive power.

The zoom lens system can include an aperture stop SP disposed at the object side of the third lens unit L3a-d, and a flare stop FP disposed at the image side of the third lens unit L3a-d. The flare stop FP shields unwanted light.

The zoom lens system can also include an optical block G, which is, for example, an optical filter, a face-plate, a crystal low-pass filter, an infrared-cut filter or other optical filter as known by one of ordinary skill in the relevant arts.

An image plane IP corresponds to an imaging plane of a solid-state image sensing device (photoelectric transducer) 22, such as a CCD (charge-coupled device) sensor or a COMS (complementary metal-oxide semiconductor) sensor, when the zoom lens system of each of the exemplary embodiments is used as the shooting optical system of a video camera or a digital still camera. Alternatively, the image plane IP corresponds to a film plane when the zoom lens system of each of the exemplary embodiments is used as the shooting optical system of a silver-halide film camera.

Each of the aberration diagrams shows curves representing spherical aberration, each of which relates to the d-line and the g-line, astigmatism which relates to a meridional image plane $\Delta M$ and a sagittal image plane $\Delta S$, distortion, and lateral chromatic aberration represented corresponding to the g-line by employing the d-line as a reference, at a predetermined F-number fno and a predetermined half angle $\omega$ of view, and where the Y-axis in the spherical aberration's graph is entrance pupil radius, the Y-axis in the astigmatism's, distortion's and chromatic aberration of magnification's graphs is image height.

In the following description of each of the exemplary embodiments, the terms "wide-angle end" and "telephoto end" designate zoom positions respectively corresponding to both ends of a range in which magnification varying lens units can move on an optical axis in a mechanism.

In each of the exemplary embodiments, when zooming from the wide-angle end to the telephoto end is performed, the lens units are moved in the directions of arrows, respectively.

More specifically, in each of the exemplary embodiments, when the zooming from the wide-angle end to the telephoto end is performed, the first lens unit L1a-d is moved (A1-A4) toward the object side, while the second lens unit L2a-d is moved (B1-B4) on a path that is convex to the image side.

Also, the third lens unit L3a-d is moved (C1-C4) to the object side, while the fourth lens unit L4a-d is moved on a path that is convex to the object side.

During zooming, each of the first lens unit L1a-d and the third lens unit L3a-d is moved (C1-C4) to a position corresponding to the telephoto end, which is closer to the object side than another position corresponding to the wide-angle end. Thus, the overall length of the lens system corresponding to the wide-angle end is maintained at a small value, so that a larger zoom ratio can be obtained.

Especially, in each of the exemplary embodiments, during zooming, the third lens unit L3a-d is moved (C1-C4) to the object side. Thus, the third lens unit L3a-d has a larger effect of varying the magnification. Additionally, the first lens unit L1a-d of positive refractive power is moved (A1-A4) to the object side. Thus, the second lens unit L2a-d also has an effect of varying magnification. Consequently, a large zoom ratio of 5 or more can be obtained without setting the refractive power of each of the first lens unit L1a-d and the second lens unit L2a-d at a very large value.

Also, the fourth lens L4a-d is moved on the optical axis to perform focusing. That is, each of the exemplary embodiments employs the zoom lens system of the rear-focus type.

In a case where focusing from an object at infinity to a short-range object is performed at the telephoto end, the fourth lens L4a-d is frontwardly moved, as indicated by arrows 4c1-4 in each of FIGS. 1, 4, 7, and 10. A path of movement of the fourth lens unit L4a-d during focusing to an object at infinity, and a path of movement of the fourth lens unit L4 during focusing to a short-range object are indicated by a solid-line curve 4a1-4 and a dashed-line curve 4b1-4, respectively.

In each of the exemplary embodiments, a light-weight fourth lens unit L4a-d is moved for focusing. Thus, quick focusing, for example, automatic focus detection is facilitated.

In each of the exemplary embodiments, the third lens unit L3a-d is moved to have a component in a direction perpendicular to the optical axis. A case, in which the third lens unit L3a-d is "moved to have a component in a direction perpendicular to the optical axis", includes a case, in which the lens unit L3a-d is moved in a direction orthogonal to the optical axis, and a case, in which the lens unit L3a-d is turned around a point on the optical axis.

Consequently, each of the exemplary embodiments performs image stabilizing without newly adding an optical member, such as a variable angle prism, or an additional image stabilizing lens unit to the zoom lens system. Thus, this can decrease the chance of the entire optical system from becoming large in size.

Although the aperture stop SP is moved integrally with the third lens unit L3a-d during zooming, the aperture stop SP can be moved separately from the third lens unit L3a-d independent of each other. Also, the aperture stop SP can be stationary during zooming. In a case where the aperture stop SP is moved integrally with the third lens unit L3a-d during zooming, the number of units, which are classified according to whether the units are to be moved or are movable, can be reduced. Thus, a mechanical structure of the zoom lens system can be simplified.

It can be useful for reducing the diameter of the front lens to move the aperture stop SP separately from the third lens unit L3a-d.

In the case where the aperture stop SP is stationary, it can be unnecessary to move a diaphragm unit. Thus, during zooming, drive torque of a drive actuator can be set at a small value. This can be useful in saving electric-power.

In at least one exemplary embodiment, the number of lenses of the first lens unit L1a-d is small, because the effective diameter thereof is increased.

In each of the exemplary embodiments, one positive lens and one negative lens can be bonded to each other or are disposed as single lenses independent of each other in the first lens unit L1a-d. Thus, chromatic aberration is suppressed by reducing the number of lenses from occurring in the first lens unit L1a-d.

The second lens unit L2a-d can include 3 single-lenses, which can be two negative lenses and one positive lens and are independent of one another (that is, the adjacent lenses are disposed by being spaced from each other). More specifically, the second unit L2a-d can include 3 lenses arranged in order from an object side, that is, a meniscus-shaped negative lens whose object-side surface is convex, a biconcave negative lens, and a positive lens whose object-side surface is convex.

Consequently, aberration variation during zooming is reduced. Especially, distortion aberration, which is caused when the focal length of the lens is set at the wide-angle end, and spherical aberration, which is caused when the focal length of the lens is set at the telephoto end, are favorably corrected.

The third lens unit L3a-d includes two positive lenses and a negative lens whose image-side surface is concave, which are arranged in order from the object side to the image side. With this lens configuration, a principal point distance between the second lens unit L2a-d and the third lens unit L3a-d is reduced to a small value. Also, a total length of the third lens unit L3a-d and a part posterior to the third lens unit L3a-d in the zoom lens system is reduced.

The third lens unit L3a-d can have at least one aspherical surface. Consequently, aberration variation caused during zooming is favorably corrected.

The fourth lens unit L4a-d can include one positive lens whose object-side surface is convex.

With the above configuration, the zoom lens system of each of the exemplary embodiments realizes a compact optical system that achieves a high zoom ratio. Additionally, the zoom lens system of each of the exemplary embodiments is adapted to satisfy one or more of the following conditional expressions.

$$0.7 < \beta2z/\beta3z < 1.3 \quad (1)$$

$$-0.3 \leq f2/ft \leq -0.1 \quad (2)$$

$$0.2 < X1/ft < 0.5 \quad (3)$$

$$0.2 < X3/ft < 0.5 \quad (4)$$

$$2.0 < X1/X2 < 4.0 \quad (5)$$

$$1.0 < (Rb+Ra)/(Rb-Ra) < 2.0 \quad (6)$$

Where, a ratio $\beta2z$ of an imaging magnification of the second lens unit L2a-d corresponding to the telephoto end, to an imaging magnification of the second lens unit L2a-d corresponding to the wide-angle end, a ratio $\beta3z$ of an imaging magnification of the third lens unit L3a-d corresponding to the telephoto end, to an imaging magnification of the third lens unit L3a-d corresponding to the wide-angle end, a focal length f2 of the second lens unit L2a-d, and a focal length ft of the zoom lens system corresponding to the telephoto end are adapted to satisfy the above conditions. Also, an amount X1 of movement of the first lens unit L1a-d on the optical axis during zooming from the wide-angle end to the telephoto end, an amount X2 of movement of the second lens unit L2a-d on the optical axis during zooming from the wide-angle end to the telephoto end, and an amount X3 of movement of the third lens unit L3a-d on the optical axis during zooming from the wide-angle end to the telephoto end are adapted to meet the above conditions. The "amount of movement" of the lens unit is a difference between the position of the lens unit, which corresponds to the wide-angle end, and the position of the lens unit, which corresponds to the telephoto end. Also, a curvature radius (a paraxial curvature radius in the case of an aspherical surface) Ra of an object side surface and a curvature radius (a paraxial curvature radius in the case of an aspherical surface) Rb of an image side surface of one lens of the fourth lens unit L4a-d are adapted to meet the above conditions.

Next, technical meanings of the above conditional expressions are described below.

In a case where ($\beta2z/\beta3z$) is less than the lower limit shown in the conditional expression (1) and where a part of a load of varying a focal length, which is shared by the third lens unit, is increased, thus it can be useful for obtaining a sufficient zoom ratio to increase the amount of movement of the third lens unit. This can be less useful, because variation of an exit pupil during zooming is increased.

Conversely, in a case where ($\beta2z/\beta3z$) is more than the upper limit shown in the conditional expression (1), the refractive power of the second lens unit L2a-d or the amount of movement thereof during zooming is too large. Thus, it can be difficult to achieve favorable correction of aberration over the entire zooming range.

In a case where the focal length of the second lens unit L2a-d is reduced to a value lower than the lower limit obtained from the conditional expression (2) (that is, the absolute value of a negative value thereof increases), thus it can be useful to increase the amount of movement of the second lens unit L2a-d so as to obtain a sufficient zoom ratio. Consequently, the overall length of a lens barrel is increased.

Conversely, in a case where the refractive power of the second lens unit L2a-d is too large so that (f2/ft) exceeds the upper limit shown in the conditional expression (2), aberration variation becomes large over the entire zooming range. Thus, it can be difficult to correct the aberration variation.

According to the conditional expression (3), the amount of movement of the first lens unit L1a-d during zooming is appropriately set. In a case where (X1/ft) is less than the lower limit shown in the conditional expression (3) and where the amount of movement of the first lens unit L1a-d is too small, a sufficient distance between the first lens unit L1a-d and the second lens unit L2a-d is less likely to be assured corresponding to the telephoto end. Thus, a sufficient effect of varying a magnification due to the second lens unit L2a-d is less likely to be obtained. Also, to reduce the diameter of the front lens by decreasing the entrance pupil corresponding to the wide-angle end, an appropriate amount of movement of the first lens unit L1a-d is needed. Conversely, in a case where (X1/ft) exceeds the upper limit shown in the conditional expression (3), the amount of movement of the first lens unit L1a-d during zooming is too large. Thus, it can be difficult to reduce the overall length of the lens system.

In a case where the amount of movement of the third lens unit L3a-d during zooming is less than the lower limit obtained from the conditional expression (4), it can be useful to increase the refractive power of the third lens unit L3a-d so as to obtain a large zoom ratio. Thus, it can be difficult to correct spherical aberration and coma aberration corresponding to the telephoto end. Conversely, in a case where the amount of movement of the third lens unit L3a-d during zooming exceeds the upper limit obtained from the conditional expression (4) and becomes large, the overall length of the zoom lens system corresponding to the wide-angle end can be too large. This can be less useful.

As is understood from the conditional expressions (3) and (4), both of the amount X1 of movement of the first lens unit L1a-d and the amount X3 of movement of the third lens unit L3a-d increase with increase in the zoom ratio. Thus, each of the amount X1 of movement of the first lens unit L1a-d and the amount X3 of movement of the third lens unit L3a-d is normalized by the focal length ft of the zoom lens system corresponding to the telephoto end.

In a case where (X1/X2) is less than the lower limit shown in the conditional expression (5) and where the amount of movement of the second lens unit L2a-d during zooming is too large, it can be useful to assure a sufficient distance between the second lens unit L2a-d and the third lens unit L3a-d, which corresponds to the wide-angle end, so as to ensure the distance therebetween corresponding to the telephoto end. Thus, it can be difficult to reduce the overall length of the zoom lens system. Conversely, in a case where (X1/X2)

exceeds the upper limit shown in the conditional expression (5) and where the amount of movement of the first lens unit L1a-d during zooming is too large, only the first lens unit L1a-d is too large in stroke, as compared with the other lens units. Thus, to reduce the length of the collapsible structure, one can construct the collapsible structure as a multi-stage type. Consequently, the diameter of a lens barrel can be large. This can be less useful.

In a case where the zoom lens system is shaped so that (Rb+Ra)/(Rb−Ra) is less than the lower limit shown in the conditional expression (6), a back focus is shortened. Conversely, in a case where the zoom lens system is shaped so that (Rb+Ra)/(Rb−Ra) exceeds the upper limit shown in the conditional expression (6), the refractive power of the fourth lens unit L4a-d is insufficient. Thus, it can be difficult to obtain a sufficient zoom ratio.

To miniaturize the entire lens system by simultaneously performing aberration correction and reducing aberration variation, in at least one exemplary embodiment the setting of numerical ranges represented by the above conditional expressions (1) to (6) can be changed as follows:

$$0.75 < \beta 2z/\beta 3z < 1.20 \tag{1a}$$

$$-0.3 \leq f2/ft \leq -0.15 \tag{2a}$$

$$0.25 < X1/ft < 0.40 \tag{3a}$$

$$0.25 < X3/ft < 0.40 \tag{4a}$$

$$2.4 < X1/X2 < 3.4 \tag{5a}$$

$$1.2 < (Rb+Ra)/(Rb-Ra) < 1.85 \tag{6a}$$

As described above, according to each of the exemplary embodiments, even when a higher zoom ratio is realized, the reduction in the overall length of the zoom lens system can be achieved by appropriately setting the amount of movement of each of the lens units and the refractive power of each of the lens units.

Also, a zoom lens system having good optical performance over the entire zooming range from the wide-angle end to the telephoto end can be obtained.

Next, first to fourth numerical examples respectively corresponding to the first to fourth exemplary embodiments are described below. In the following description of the numerical examples, "i" designates the ordinal number of each optical surface from the object side. Further, "ri" denotes a curvature radius of the i-th (optical) surface, "di" designates the distance between the i-th surface and the (i+1)-th surface, and "ni" and "vi" respectively denote the refractive index and the Abbe number of the material of the i-th optical member corresponding to the d-line.

An aspherical shape is expressed by the following equation:

$$x = (h^2/R)/[1+[1-(1+k)(h/R)^2]^{1/2}] + Bh^4 + Ch^6 + Dh^8$$

where "k" is a conic constant, "B", "C", and "D" are aspheric coefficients, "x" is an amount of displacement in the direction of the optical axis at a height "h" from the optical axis, and "R" is a paraxial curvature radius. For example, the expression "E-Z" means "$10^{-z}$". Additionally, "f", "fno", and "ω" designate a focal length, an f-number, and a half angle of view, respectively.

In each of the numerical examples, the final two surfaces constitute the optical block G.

Additionally, Table 1 shows the corresponding relation between the above-described conditional expressions and the numerical examples.

FIRST NUMERICAL EXAMPLE f = 5.77-32.98 fno = 2.9-4.9 2ω = 63.4°-12.3°

| | | | |
|---|---|---|---|
| r1 = 23.920 | d1 = 0.90 | n1 = 1.84666 | v1 = 23.8 |
| r2 = 17.169 | d2 = 3.21 | n2 = 1.69680 | v2 = 55.5 |
| r3 = 192.065 | d3 = Variable | n3 = 1.88300 | v3 = 40.8 |
| r4 = 26.447 | d4 = 0.65 | n4 = 1.69680 | v4 = 55.5 |
| r5 = 6.215 | d5 = 3.17 | n5 = 1.84666 | v5 = 23.8 |
| r6 = −19.993 | d6 = 0.60 | n6 = 1.58313 | v6 = 59.4 |
| r7 = 19.186 | d7 = 0.60 | n7 = 1.48749 | v7 = 70.2 |
| r8 = 13.726 | d8 = 1.80 | n8 = 1.84666 | v8 = 23.8 |
| r9 = −919.492 | d9 = Variable | n9 = 1.58313 | v9 = 59.4 |
| r10 = Stop | d10 = 0.80 | n10 = 1.51633 | v10 = 64.1 |
| r11 = 7.374 | d11 = 2.30 | | |
| r12 = −23.171 | d12 = 0.20 | | |
| r13 = 5.120 | d13 = 1.60 | | |
| r14 = 9.893 | d14 = 0.80 | | |
| r15 = 3.904 | d15 = Variable | | |
| r16 = 10.154 | d16 = 2.00 | | |
| r17 = 49.838 | d17 = Variable | | |
| r18 = ∞ | d18 = 2.00 | | |
| r19 = ∞ | | | |

| | Focal Length | | |
|---|---|---|---|
| Variable Distance | 5.77 | 13.78 | 32.98 |
| d3 | 0.40 | 9.85 | 16.26 |
| d9 | 18.03 | 7.06 | 1.90 |
| d15 | 7.20 | 8.93 | 19.14 |
| d17 | 2.00 | 4.30 | 2.46 |

Aspheric Coefficients

11th Surface: k = −2.51604E−1 B = −1.22226E−4 C = 3.44854E−6 D = 4.71772E−7
12th Surface: k = 9.03719 B = 3.46637E−4 C = 6.34455E−6 D = 5.48840E−7

SECOND NUMERICAL EXAMPLE f = 5.78-32.59 fno = 2.9-4.9 2ω = 63.3°-12.5°

| | | | |
|---|---|---|---|
| r1 = 25.336 | d1 = 0.90 | n1 = 1.84666 | v1 = 23.8 |
| r2 = 18.417 | d2 = 3.20 | n2 = 1.69680 | v2 = 55.5 |
| r3 = 198.277 | d3 = Variable | n3 = 1.88300 | v3 = 40.8 |
| r4 = 29.935 | d4 = 0.65 | n4 = 1.69680 | v4 = 55.5 |
| r5 = 6.525 | d5 = 2.91 | n5 = 1.84666 | v5 = 23.8 |
| r6 = −24.896 | d6 = 0.60 | n6 = 1.58913 | v6 = 61.1 |
| r7 = 18.550 | d7 = 0.60 | n7 = 1.48749 | v7 = 70.2 |
| r8 = 13.181 | d8 = 1.70 | n8 = 1.84666 | v8 = 23.8 |
| r9 = 279.148 | d9 = Variable | n9 = 1.74330 | v9 = 49.3 |
| r10 = Stop | d10 = 0.80 | n10 = 1.51633 | v10 = 64.1 |
| r11 = 7.036 | d11 = 2.30 | | |
| r12 = −22.129 | d12 = 0.10 | | |
| r13 = 5.660 | d13 = 1.70 | | |
| r14 = 11.567 | d14 = 1.10 | | |
| r15 = 3.864 | d15 = Variable | | |
| r16 = 10.355 | d16 = 2.00 | | |
| r17 = 36.340 | d17 = Variable | | |
| r18 = ∞ | d18 = 2.00 | | |
| r19 = ∞ | | | |

| | Focal Length | | |
|---|---|---|---|
| Variable Distance | 5.78 | 13.73 | 32.59 |
| d3 | 0.40 | 10.48 | 17.68 |
| d9 | 17.98 | 7.06 | 1.90 |
| d15 | 6.33 | 8.33 | 17.34 |
| d17 | 2.00 | 3.84 | 2.12 |

-continued

Aspheric Coefficients

11th Surface: k = 7.37878E−2 B = −2.84074E−4 C = −6.05152E−6
D = 7.43239E−7 E = −3.46116E−8
12th Surface: k = 0 B = 2.52279E−4 C = −2.60949E−6
D = 4.66192E−7
16th Surface: k = 0 B = 1.79575E−5 C = 1.19826E−6 D = 0

THIRD NUMERICAL EXAMPLE f = 5.95-39.48 fno = 2.8-4.9 2ω = 61.8°-10.3°

| r1 = 21.638 | d1 = 1.00 | n1 = 1.84666 | ν1 = 23.8 |
| r2 = 15.483 | d2 = 0.30 | n2 = 1.69680 | ν2 = 55.5 |
| r3 = 15.968 | d3 = 3.60 | n3 = 1.88300 | ν3 = 40.8 |
| r4 = 218.206 | d4 = Variable | n4 = 1.69680 | ν4 = 55.5 |
| r5 = 32.696 | d5 = 0.65 | n5 = 1.84666 | ν5 = 23.8 |
| r6 = 6.283 | d6 = 3.05 | n6 = 1.58913 | ν6 = 59.4 |
| r7 = −19.950 | d7 = 0.60 | n7 = 1.49700 | ν7 = 81.5 |
| r8 = 19.664 | d8 = 0.60 | n8 = 1.80610 | ν8 = 33.3 |
| r9 = 13.787 | d9 = 1.80 | n9 = 1.48749 | ν9 = 70.2 |
| r10 = −3380.250 | d10 = Variable | n10 = 1.51633 | ν10 = 64.1 |
| r11 = Stop | d11 = 0.70 | | |
| r12 = 8.721 | d12 = 2.30 | | |
| r13 = −16.711 | d13 = 0.20 | | |
| r14 = 4.275 | d14 = 1.90 | | |
| r15 = 33.893 | d15 = 0.70 | | |
| r16 = 3.549 | d16 = Variable | | |
| r17 = 9.158 | d17 = 2.00 | | |
| r18 = 89.389 | d18 = Variable | | |
| r19 = ∞ | d19 = 2.00 | | |
| r20 = ∞ | | | |

| | Focal Length | | |
|---|---|---|---|
| Variable Distance | 5.95 | 15.31 | 39.48 |
| d4 | 0.40 | 9.68 | 16.75 |
| d10 | 18.49 | 6.85 | 2.00 |
| d16 | 7.26 | 8.72 | 19.18 |
| d18 | 2.00 | 5.08 | 2.40 |

Aspheric Coefficients

12th Surface: k = −3.99616E−1 B = −8.97537E−5 C = 1.67141E−6
D = −4.36098E−8
13th Surface: k = −1.65387E−1 B = 1.79023E−4 C = −1.56975E−6
D = 1.04720E−7

FOURTH NUMERICAL EXAMPLE f = 5.95-45.89 fno = 2.8-4.9 2ω = 61.8°-8.9°

| r1 = 21.158 | d1 = 1.00 | n1 = 1.84666 | ν1 = 23.8 |
| r2 = 14.748 | d2 = 0.30 | n2 = 1.69680 | ν2 = 55.5 |
| r3 = 15.266 | d3 = 3.60 | n3 = 1.88300 | ν3 = 40.8 |
| r4 = 320.851 | d4 = Variable | n4 = 1.69680 | ν4 = 55.5 |
| r5 = 30.053 | d5 = 0.65 | n5 = 1.92286 | ν5 = 18.9 |
| r6 = 6.213 | d6 = 3.21 | n6 = 1.58313 | ν6 = 59.4 |
| r7 = −14.497 | d7 = 0.60 | n7 = 1.49700 | ν7 = 81.5 |
| r8 = 55.295 | d8 = 0.60 | n8 = 1.80610 | ν8 = 33.3 |
| r9 = 17.071 | d9 = 1.80 | n9 = 1.48749 | ν9 = 70.2 |
| r10 = 150.435 | d10 = Variable | n10 = 1.51633 | ν10 = 64.1 |
| r11 = Stop | d11 = 0.70 | | |
| r12 = 9.028 | d12 = 2.30 | | |
| r13 = −16.421 | d13 = 0.20 | | |
| r14 = 4.082 | d14 = 1.90 | | |
| r15 = 30.264 | d15 = 0.70 | | |
| r16 = 3.409 | d16 = Variable | | |
| r17 = 8.810 | d17 = 2.00 | | |
| r18 = 41.011 | d18 = Variable | | |
| r19 = ∞ | d19 = 2.00 | | |
| r20 = ∞ | | | |

| | Focal Length | | |
|---|---|---|---|
| Variable Distance | 5.95 | 16.51 | 45.89 |
| d4 | 0.40 | 10.14 | 17.45 |
| d10 | 18.83 | 7.22 | 1.99 |
| d16 | 7.46 | 8.94 | 19.57 |
| d18 | 2.00 | 5.45 | 2.31 |

Aspheric Coefficients

12th Surface: k = −9.27367E−1 B = 1.33709E−5 C = −1.37165E−6
D = 1.65086E−7
13th Surface: k = −1.65387E−1 B = 1.79023E−4 C = −1.56975E−6
D = 1.04720E−7

TABLE 1

| Conditional Expression | | First Example | Second Example | Third Example | Fourth Example |
|---|---|---|---|---|---|
| (1) | β2z/β3z | 0.76 | 0.83 | 0.96 | 1.17 |
| (2) | f2/ft | −0.28 | −0.30 | −0.22 | −0.18 |
| (3) | X1/ft | 0.37 | 0.38 | 0.31 | 0.28 |
| (4) | X3/ft | 0.38 | 0.34 | 0.31 | 0.27 |
| (5) | X1/X2 | 3.25 | 2.49 | 2.92 | 2.86 |
| (6) | (Rb + Ra)/(Rb − Ra) | 1.51 | 1.80 | 1.23 | 1.55 |

Next, an exemplary embodiment of a digital still camera using the zoom lens system, which has been described in the foregoing description of the exemplary embodiments, as an shooting optical system is described below by referring to FIG. 13.

As shown in FIG. 13, the digital still camera includes a camera body 20 and a shooting optical system 21 including one of the zoom lens systems that have been described in the foregoing description of the first to fourth exemplary embodiments. The camera also includes a solid-state image sensing device 22, such as a CCD sensor or a COMS sensor, which is incorporated in the camera body 20 and receives light representing an object image formed by the shooting optical system 21. The camera also includes a memory 23 that stores information corresponding to the object image, the photoelectric conversion of which is performed by the solid-state image sensing device 22. The camera also includes a viewfinder 24, which has a liquid crystal display panel and is used to observe an object image formed on the solid-state image sensing device 22.

Thus, a compact high-optical-performance image pickup apparatus can be realized by applying the zoom lens system according to at least one exemplary embodiment of the invention to, for example, a digital still camera.

While the present invention has been described with reference to exemplary embodiments, it is to be understood that the invention is not limited to the discussed exemplary embodiments. The scope of the following claims is to be accorded the broadest interpretation so as to encompass all modifications, equivalent structures, and functions.

This application claims priority from Japanese Patent Application No. 2005-301083 filed Oct. 15, 2005, which is hereby incorporated by reference herein in its entirety.

What is claimed is:

1. A zoom lens system comprising, in order from an object side to an image side:

a first lens unit of positive optical power;
a second lens unit of negative optical power;
a third lens unit of positive optical power; and
a fourth lens unit of positive optical power,
wherein zooming is performed by moving each of the lens units,
wherein the first lens unit moves during zooming so that position of the first lens unit, which corresponds to a telephoto end, is closer to the object side than position of the first lens unit, which corresponds to a wide-angle end and the third lens unit moves during zooming so that position of the third lens unit, which corresponds to a telephoto end, is closer to the object side than position of the third lens unit, which corresponds to a wide-angle end, and
wherein a ratio β2z of an imaging magnification of the second lens unit corresponding to the telephoto end, to an imaging magnification of the second lens unit corresponding to the wide-angle end, a ratio β3z of an imaging magnification of the third lens unit corresponding to the telephoto end, to an imaging magnification of the third lens unit corresponding to the wide-angle end, a focal length f2 of the second lens unit, and a focal length ft of the zoom lens system corresponding to the telephoto end meet the following conditions:

$0.7 < \beta 2z/\beta 3z < 1.3$, and $-0.3 \leq f2/ft \leq -0.1$, wherein the third lens unit moves to have a component in a direction perpendicular to an optical axis, and
wherein an image formed by the zoom lens system is changed by movement of the third lens unit.

2. The zoom lens system according to claim 1, wherein an amount X1 of movement of the first lens unit on an optical axis during zooming from the wide-angle end to the telephoto end meets the following condition:

$0.2 < X1/ft < 0.5$.

3. The zoom lens system according to claim 2, wherein the third lens unit has at least one aspherical surface.

4. The zoom lens system according to claim 1, wherein an amount X3 of movement of the third lens unit on an optical axis during zooming from the wide-angle end to the telephoto end meets the following condition:

$0.2 < X3/ft < 0.5$.

5. The zoom lens system according to claim 1, wherein an amount X1 of movement of the first lens unit on an optical axis and an amount X2 of the second lens unit on the optical axis during zooming from the wide-angle end to the telephoto end meet the following condition:

$2.0 < X1/X2 < 4.0$.

6. The zoom lens system according to claim 1, wherein the fourth lens unit moves during focusing.

7. The zoom lens system according to claim 1, wherein the second lens unit includes three independent lens elements including two negative lens elements and one positive lens element.

8. The zoom lens system according to claim 1, wherein the fourth lens unit includes one lens element, and wherein a curvature radius Ra of an object side surface and a curvature radius Rb of an image side surface of the lens element of the fourth lens unit meet the following condition:

$1.0 < (Rb+Ra)/(Rb-Ra) < 2.0$.

9. An image pickup apparatus comprising:

the zoom lens system according to claim 1; and
a solid-state image sensing device configured to receive light representing an image formed by the zoom lens system.

10. A zoom lens system comprising, in order from an object side to an image side:

a first lens unit of positive optical power;
a second lens unit of negative optical power;
a third lens unit of positive optical power; and
a fourth lens unit of positive optical power,
wherein zooming is performed by moving each of the lens units,
wherein the first lens unit moves during zooming so that position of the first lens unit, which corresponds to a telephoto end, is closer to the object side than position of the first lens unit, which corresponds to a wide-angle end and the third lens unit moves during zooming so that position of the third lens unit, which corresponds to a telephoto end, is closer to the object side than position of the third lens unit, which corresponds to a wide-angle end,
wherein an amount X1 of movement of the first lens unit on an optical axis during zooming from the wide-angle end to the telephoto end meets the following condition:

$0.2 < X1/ft < 0.5$, and wherein a ratio β2z of an imaging magnification of the second lens unit corresponding to the telephoto end, to an imaging magnification of the second lens unit corresponding to the wide-angle end, a ratio β3z of an imaging magnification of the third lens unit corresponding to the telephoto end, to an imaging magnification of the third lens unit corresponding to the wide-angle end, a focal length f2 of the second lens unit, and a focal length ft of the zoom lens system corresponding to the telephoto end meet the following conditions:

$0.7 < \beta 2z/\beta 3z < 1.3$, and $-0.3 \leq f2/ft \leq -0.1$.

11. The zoom lens system according to claim 10, wherein an amount X3 of movement of the third lens unit on an optical axis during zooming from the wide-angle end to the telephoto end meets the following condition:

$0.2 < X3/ft < 0.5$.

12. The zoom lens system according to claim 10, wherein an amount X1 of movement of the first lens unit on an optical axis and an amount X2 of the second lens unit on the optical axis during zooming from the wide-angle end to the telephoto end meet the following condition:

$2.0 < X1/X2 < 4.0$.

13. The zoom lens system according to claim 10, wherein the third lens unit has at least one aspherical surface.

14. A zoom lens system comprising, in order from an object side to an image side:

a first lens unit of positive optical power;
a second lens unit of negative optical power;
a third lens unit of positive optical power; and
a fourth lens unit of positive optical power, wherein zooming is performed by moving each of the lens units, wherein the first lens unit moves during zooming so that position of the first lens unit, which corresponds to a telephoto end, is closer to the object side than position of the first lens unit, which corresponds to a wide-angle end and the third lens unit moves during zooming so that position of the third lens unit, which corresponds to a telephoto end, is closer to the object side than position of the third lens unit, which corresponds to a wide-angle end, wherein a ratio β2z of an imaging magnification of the second lens unit corresponding to the telephoto end, to an imaging magnification of the second lens unit corresponding to the wide-angle end, a ratio β3z of an imaging magnification of the third lens unit corresponding to the telephoto end, to an imaging magnification of the third lens unit corresponding to the wide-angle end, a focal length f2 of the second lens unit, and a focal length ft of the zoom lens system corresponding to the telephoto end meet the following conditions:

$$0.7 < \beta 2z/\beta 3z < 1.3, \text{ and}$$

$$-0.3 \leq f2/ft \leq -0.1, \text{ and}$$

wherein an amount X3 of movement of the third lens unit on an optical axis during zooming from the wide-angle end to the telephoto end meets the following condition:

$$0.2 < X3/ft < 0.5.$$

15. The zoom lens system according to claim 14, wherein an amount X1 of movement of the first lens unit on an optical axis and an amount X2 of the second lens unit on the optical axis during zooming from the wide-angle end to the telephoto end meet the following condition:

$$2.0 < X1/X2 < 4.0.$$

16. A zoom lens system comprising, in order from an object side to an image side:

a first lens unit of positive optical power;

a second lens unit of negative optical power;

a third lens unit of positive optical power; and a fourth lens unit of positive optical power, wherein zooming is performed by moving each of the lens units, wherein the first lens unit moves during zooming so that position of the first lens unit, which corresponds to a telephoto end, is closer to the object side than position of the first lens unit, which corresponds to a wide-angle end and the third lens unit moves during zooming so that position of the third lens unit, which corresponds to a telephoto end, is closer to the object side than position of the third lens unit, which corresponds to a wide-angle end, wherein a ratio β2z of an imaging magnification of the second lens unit corresponding to the telephoto end, to an imaging magnification of the second lens unit corresponding to the wide-angle end, a ratio β3z of an imaging magnification of the third lens unit corresponding to the telephoto end, to an imaging magnification of the third lens unit corresponding to the wide-angle end, a focal length f2 of the second lens unit, and a focal length ft of the zoom lens system corresponding to the telephoto end meet the following conditions:

$$0.7 < \beta 2z/\beta 3z < 1.3, \text{ and}$$

$$-0.3 \leq f2/ft \leq -0.1,$$

wherein an amount X1 of movement of the first lens unit on an optical axis and an amount X2 of the second lens unit on the optical axis during zooming from the wide-angle end to the telephoto end meet the following condition:

$$2.0 < X1/X2 < 4.0.$$

* * * * *